MASS SPECTROMETER SAMPLE INSERTION DEVICES

Original Filed Aug. 30, 1962

INVENTORS:
Robert Derek Craig
Edward Willdig
By: Pillars and Bowyer
ATTORNEY

United States Patent Office

Re. 26,392
Reissued May 21, 1968

26,392
MASS SPECTROMETER SAMPLE INSERTION DEVICES

Robert D. Craig, Bowdon, and Edward Willdig, Stretford, England, assignors to Associated Electrical Industries Limited, London, England, a British company Original No. 3,158,740, dated Nov. 24, 1964, Ser. No. 220,409, Aug. 30, 1962. Application for reissue July 5, 1966, Ser. No. 569,767
10 Claims. (Cl. 250—41.9)

Matter enclosed in heavy brackets [ ] appears in the original patent but forms no part of this reissue specification; matter printed in italics indicates the additions made by reissue.

The present invention relates to devices for inserting solid samples into the ion source of a mass spectrometer. In the ion source ions are produced from the material of the sample and these ions are subsequently accelerated into the main body of the mass spectrometer for analysis in any well known manner.

If the sample is a solid, one method of ion production is to heat the sample until it vaporizes and then to bombard the molecules of the sample material with electrons to produce ions.

The object of the present invention is to provide an improved sample insertion device for a mass spectrometer.

According to the present invention a sample insertion device for use in a mass spectrometer ion source comprises a heating element mounted on a body portion which is adapted to be inserted in the ion source so that the free end of the heating element, which is adapted to support the sample, is located adjacent to the ionization region in the ion source.

Preferably the heating element comprises an electric heating coil.

The heating element may be supported on a helical spring which extends from the end of the body portion.

Figure 1:
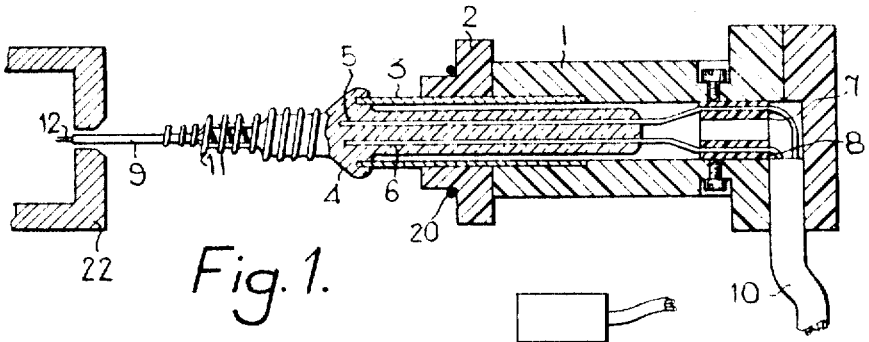
Figure 2:
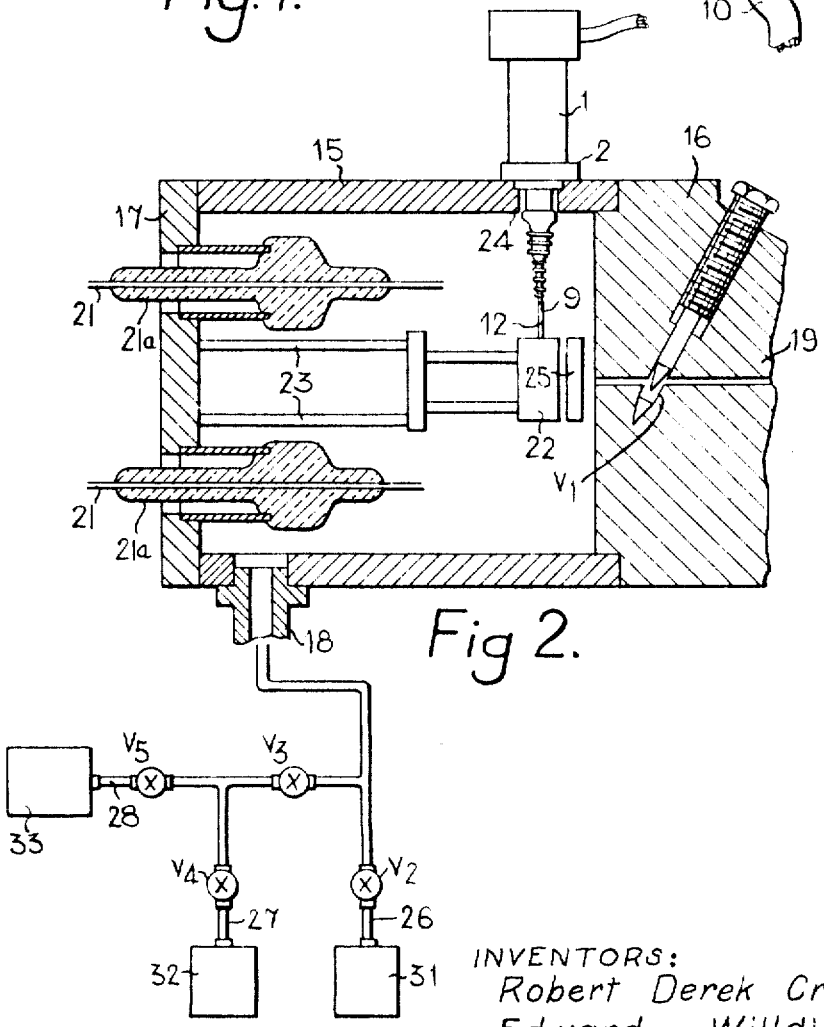

In order that the invention may be more readily understool reference will now be made to the accompanying drawing, in which:

FIG. 1 is a side view sectioned on an axial plane of a sample insertion device in accordance with the invention; and FIG. 2 is a side view of an ion source of a mass spectrometer illustrating the sample insertion device in position.

With reference to FIG. 1 the sample insertion device comprises a hollow body 1 of electrically insulating material, such as polytetrafluoroethylene for example, attached to a flange 2. A metal sleeve 3 extends through the flange 2 and supports a bushing 4 of electrically insulating material such as glass. Two conductors 5, 6 extend through the bushing 4 and are connected respectively to terminals 7, 8 in the end of the body remote from the flange 2, where they are adapted to be connected to a current source through a cable 10.

The other ends of the conductors 5, 6 are connected to the filament of a tubular electric heater 9 which is supported from the bushing 4 by means of flexible spring 11. The free end 12 of the heater is adapted to support the sample to be analyzed. Passage of a current through the heater will cause the sample to be heated and evaporated. The heater can be moved relative to the bushing 4 in order to locate the free end thereof accurately but the heater is supported by the spring 11.

FIG. 2 illustrates the sample insertion device in position in an ion source of a mass spectrometer. The ion source comprises a body portion 15 with an end wall 16 and a cover plate 17. The body portion 15 is formed with a duct 18 by means of which the source may be evacuated. The end wall 16 is formed with a channel 19 which connects with the main body in the mass spectrometer. A plurality of high tension conductors 21 for the electrodes of the ion source extend through insulating bushings 21a in the cover plate 17.

An ionization chamber 22 is supported from the cover plate 17 by a suitable structure 23, and the ionization chamber includes a filament, an electron accelerating electrode and an electron trap which produce a beam of electrons extending transversely across the body portion 15. The electrodes of the ionization chamber assembly are connected respectively to conductors 21.

The body portion 15 is also formed with an aperture 24 which is adapted to receive the sample insertion device illustrated in FIG. 1. The flange 2 is adapted to be sealed into the aperture 24 by means of a sealing ring 20, and the heater 9 projects towards the ionization chamber so that the free end 12 is located adjacent to the electron beam in the ionization chamber as illustrated in FIG. 1. When the sample on the end 12 is heated by passing a current through the heater 9 the sample vaporizes and molecules of the sample material are bombarded by the electrons and ions are produced. The ion source includes a suitably placed electrode system 25 which accelerates the ions so formed towards the channel 19, and hence the ions pass through the channel 19 into the main body of the mass spectrometer for analysis.

By supporting the heater 9 flexibly, the end 12 thereof may be inserted into an aperture in the ionization chamber 22 which is not accurately aligned with the aperture 24. This aperture is conveniently slightly tapered to assist location of the end 12.

The components of the ionization chamber 22 are normally maintained at a high voltage, in the order of 10 kv., and since the filament of the heater 9 may touch these high voltage components, it is necessary that the conductors 5, 6, the terminals 7, 8 and the cable 10 should be insulated so as to withstand this voltage to earth. The supply circuit for the heater conveniently includes a step-down transformer which is insulated between the windings for this high voltage. The body 1 is made of an electrically insulating material in order to protect the operator.

FIG. 2 illustrates the arrangement of valves which is used to control the evacuation of the chamber through the duct 18. Valve $V_1$ is connected in channel 19 leading to the main body of the mass spectrometer, and valves $V_2$, $V_3$, $V_4$ and $V_5$ are respectively connected in ducts 26, 27 and 28 in the manner illustrated. Duct 26 is a high vacuum pump line and is connected to a cold trap, a diffusion pump and a rotary pump denoted by 31. Duct 27 is a low vacuum pump line and is connected to a rotary pump 32. Duct 28 is connected to a source of air or dry nitrogen 33.

When it is necessary to change the sample in the ion source the following operational steps are performed in sequence.

(1) Close $V_1$
(2) Close $V_2$
(3) Open $V_3$
(4) Close $V_4$
(5) Open $V_5$

These steps open the ion source to the air or nitrogen supply and raise the pressure in the chamber 15 gradually. The sample insertion device can then be withdrawn and the sample replace. The sample insertion device is then replace in the ion source.

In order to prepare the ion source for operation the steps are reversed:

(6) Close $V_5$
(7) Open $V_4$
(8) Close $V_3$
(9) Open $V_2$
(10) Open $V_1$

It will be appreciated that as the ion source is being evacuated successively by means of the low and high vacuum pump systems sufficient time is allowed before closing $V_3$ and opening $V_2$ for the pressure in the source to drop. Before reinserting the sample insertion device, together with the new sample, within the source, it may be desirable to get rid of all trace of the previous sample by baking the whole system as far as the cold trap in the high vacuum pump line. This baking will be to a high temperature in the order of 300° C., and, therefore, it will be necessary for all the components, including valves $V_1$, $V_2$, and $V_3$, to be bakable to this temperature.

What we claim is:

1. A sample insertion device for use in a mass spectrometer ion source comprising, a body portion, a heating element adapted to support said sample, and flexible spring means for attaching said heating element to said body portion so that when said device is inserted into said ion source the position of said heating element relative to said body portion can be adjusted in order that said sample may be located accurately within the ionization region of the ion source, and said sample can be heated.

2. A sample insertion device for use in a mass spectrometer ion source comprising, a body portion, an electrical heating element adapted to support said sample, coil spring means for attaching said electrical heating element to said body portion, and conductors for said heating element extending within said attaching means, so that when said device is inserted into said ion source the position of said electrical heating element relative to said body portion can be adjusted in order that said sample may be located accurately within the ionization region of the ion source, and said sample can be heated by the passage of a current along said conductors and through said heating element.

3. In a mass spectrometer ion source, a hollow body, an ionization chamber fixed in said hollow body, said chamber having an opening in its wall for introduction of a sample, an opening in said hollow body opposite the opening in the chamber wall and a sample insertion device comprising a body portion, a heating element carried by said body portion and adapted to support said sample, and flexible spring means for attaching said heating element to said body portion so that when said heating element is inserted into said ion source the position of said heating element relative to said body portion can be adjusted in order that said sample may be located accurately within the ionization region of the ion source, and said sample can be heated notwithstanding misalignment of the slated openings.

4. *In a mass spectrometer, the combination of:*

(*a*) *an ion source body member defining an internal space;*

(*b*) *an ionization chamber member in said space and defining an ionization chamber, said chamber and source body members being connected together;*

(*c*) *said source body and chamber members having aligned openings;*

(*d*) *a sample insertion assembly extending into said openings and closing said source body member opening;*

(*e*) *said sample insertion assembly including a body member and a sample holding member for supporting a specimen in the ionization chamber; and,*

(*f*) *said combination including resilient means between said ion source body member and said sample holding member to permit relative alignment movement between the sample holding and chamber members on insertion of the sample holding member whereby to align a specimen in the chamber.*

5. *The combination of claim* 4 *wherein one of said members includes a heater positioned within said ionization chamber to heat and vaporize a specimen.*

6. *The combination of claim* 4 *wherein the resilient means is a flexible means for mounting said sample holding member to said source body member.*

7. *The combination of claim* 6 *wherein the flexible means is a coil spring.*

8. *The combination of claim* 7 *wherein the sample holding members is a healer supported by said spring.*

9. *The combination of claim* 4 *wherein the insertion assembly electrically insulates the sample holding member and source body member.*

10. *In a mass spectrometer an improved ion liberating mechanism comprising:*

(*a*) *a body defining an ionization space;*

(*b*) *an ionization chamber including an ion source secured to the body and mounted within the space;*

(*c*) *said ionization chamber including a sample insertion aperture;*

(*d*) *a sample holder within the ionization chamber for positioning a sample in the path of an electron beam generated by the ion source;*

(*e*) *said body including a body sample insertion aperture generally aligned with said ionization chamber aperture;*

(*f*) *a sample insertion mechanism projection through and closing said body sample insertion aperture; and,*

(*g*) *said sample insertion mechanism including said sample holder and a means interposed between the sample holder and the body to permit yieldable movement of the sample holder relative to the body aperture whereby to accommodate misalignment between the two apertures and to permit the movement of the sample holder relative to the chamber sample insertion aperture on insertion of the sample insertion device, thereby to permit the sample holder to pass through the ionization chamber aperture.*

References Cited

The following references, cited by the Examiner, are of record in the patented file of this patent or the original patent.

UNITED STATES PATENTS

| | | | |
|---|---|---|---|
| 957,256 | 5/1910 | Rice | 219—26 X |
| 1,010,529 | 12/1911 | Stevens | 219—26 X |
| 2,418,903 | 4/1947 | Runge. | |
| 2,666,539 | 1/1954 | Avery. | |
| 2,677,771 | 5/1954 | Turner | 250—41.9 |
| 2,690,521 | 9/1954 | Turner. | |
| 2,710,354 | 6/1955 | Inghram et al. | 250—41.9 |
| 2,737,590 | 3/1956 | Lofgren. | |
| 2,756,341 | 7/1956 | White | 250—41.9 |
| 2,852,683 | 9/1958 | Peters et al. | 250—41.9 |

OTHER REFERENCES

Ionization and Dissociation by Electron Impact: The Methyl and Ethyl Radicals, by J. A. Hipple et al., from Physical Review, vol. 63, Nos. 3 and 4, Feb. 1 and 15, 1943, pp. 121–123.

WILLIAM F. LINDQUIST, *Primary Examiner.*

RALPH G. NILSON, *Examiner.*